United States Patent
Chhaya et al.

(10) Patent No.: US 8,130,653 B2
(45) Date of Patent: Mar. 6, 2012

(54) DELETION REQUEST AFTER NUMBER OF FAILED ACKNOWLEDGEMENTS TO ADDITION REQUESTS

(75) Inventors: Harshal S. Chhaya, Plano, TX (US); Ramanuja Vedantham, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 355 days.

(21) Appl. No.: 12/051,348

(22) Filed: Mar. 19, 2008

(65) Prior Publication Data

US 2008/0232254 A1    Sep. 25, 2008

Related U.S. Application Data

(60) Provisional application No. 60/896,152, filed on Mar. 21, 2007.

(51) Int. Cl.
*G01R 31/08* (2006.01)
(52) U.S. Cl. .................................... 370/236; 455/421
(58) Field of Classification Search .................. 370/216, 370/318, 338, 331; 455/540, 550.1, 421, 455/452.1; 714/752
See application file for complete search history.

(56) References Cited

U.S. PATENT DOCUMENTS

| | | | |
|---|---|---|---|
| 4,771,448 A * | 9/1988 | Koohgoli et al. | 455/450 |
| 7,178,080 B2 * | 2/2007 | Hocevar | 714/752 |
| 2005/0215279 A1 * | 9/2005 | Shim et al. | 455/550.1 |
| 2006/0111099 A1 * | 5/2006 | Abdel-Kader | 455/421 |
| 2006/0227747 A1 * | 10/2006 | Kim et al. | 370/331 |
| 2008/0014956 A1 * | 1/2008 | Balasubramanian | 455/452.1 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications (IEEE, 2007).

* cited by examiner

*Primary Examiner* — Aung S Moe
*Assistant Examiner* — Vincelas Louis
(74) *Attorney, Agent, or Firm* — Steven A. Shaw; W. James Brady; Frederick J. Telecky, Jr.

(57) ABSTRACT

Network circuitry and a method of operating the same in establishing and deleting a service flow in a wireless network. A network station receives a request, from an initiating network station, to establish a service flow. The network station receiving the request issues a response to that request, following which it expects an acknowledgement from the initiator. Upon absence of such an acknowledgement, the receiving station transmits a message, to the initiator, to explicitly delete the service flow. This ensures that the initiator is not placed into an ambiguous state of transmitting payload traffic to a receiver that is ignoring or not receiving that traffic, in the case in which the initiator is also the transmitter of the payload traffic. This circuitry and method also ensures that the initiator is not in an ambiguous state, in the case in which it is the intended receiver of the payload traffic.

2 Claims, 4 Drawing Sheets

DELETION REQUEST AFTER NUMBER OF FAILED ACKNOWLEDGEMENTS TO ADDITION REQUESTS

CROSS-REFERENCE TO RELATED APPLICATIONS

This application claims priority, under 35 U.S.C. §119(e), of Provisional Application No. 60/896,152, filed Mar. 21, 2007, incorporated herein by this reference.

STATEMENT REGARDING FEDERALLY SPONSORED RESEARCH OR DEVELOPMENT

Not applicable.

BACKGROUND OF THE INVENTION

This invention is in the field of digital communications, and is more specifically directed to the establishing and termination of service flows in wireless communications.

Advances in wireless communication technology, especially in recent years, have greatly improved not only the performance (i.e., data rate for a given error rate) at which wireless communications can be carried out, but have also enabled the realization of additional functions and services by way of wireless communications. For example, wireless broadband communications in metro area networks is now becoming commonplace. An example of one type of wider area wireless network communications is referred to as "WiMAX", corresponding to communications carried out under *IEEE Standard for Local and metropolitan area networks, Part* 16: *Air Interface for Fixed Broadband Wireless Access Systems* (IEEE Standard 802.16-2004, and all subsequent revisions). Of course, wireless local area networks (WLAN) are now also becoming commonplace, and are capable of carrying traffic at very high data rates (e.g., 1 Gbit/sec).

Networks operating under the WiMAX standard, for example, are capable of carrying out multiple types of communications. These multiple communications "services" are typically supported by modern wireless devices, including laptop computers equipped with WiMAX network adapters, palm top computers or highly capable personal digital assistants (PDAs), and modern "smartphones" that support data services. As known in the art, these modern wireless devices and systems, communicating via a WiMAX or other metro or wider area wireless network, support multiple simultaneous wireless communications sessions. Different types of such communications can have different constraints and requirements. For example, one class of such communications that can be carried out under WiMAX is voice telephony, for example by way of the well-known Voice over Internet Protocol (VoIP) service. VoIP communications involve constraints on the timeliness of the communications (i.e., so that a sensible back-and-forth conversation can be carried out), but can tolerate a relatively high error rate. In contrast, email services, and web browsing services over the Internet, involve less stringent time constraints, but can have higher error rate requirements.

Physically, a WiMAX metro area network is realized via base stations deployed within the physical service area with some frequency (e.g., on the order of a base station deployed every mile, to every several miles), similar to cellular telephone base stations and towers. A given base station is capable of communicating with nearby wireless client devices, typically referred to as "subscriber stations", or often as "mobile stations" considering that these devices are typically portable computing and communications devices such as laptop or palmtop computers, smartphones, and the like. Each of the traffic flows between a mobile station and a base station is typically referred to as a "service flow", in the context of WiMAX communications. For example, a VoIP call is carried out over one service flow, an email session is carried out over another service flow, and each web browsing session is carried out over another service flow. As evident from this discussion, multiple service flows may be carried out simultaneously between a mobile station and a base station; indeed, communications in each direction (e.g., uplink and downlink) is typically considered a separate service flow, such that bidirectional communications in an interactive web session, for example, typically constitutes two service flows.

Under conventional communications under the IEEE 802.16 standard, a service flow is established at the request of either the base station or the mobile station, regardless of whether the requesting station is to transmit or receive the payload traffic. FIG. 1*a* illustrates the operation of establishing a service flow in such conventional wireless broadband communications. As shown in FIG. 1*a*, the requesting station ("initiator") transmits a request (referred to as a Dynamic Service Addition Request, or DSA-REQ, under IEEE 802.16) to establish the service flow to the other station ("responder"). The request can include data rate requirements and other parameters, and can also specify bidirectional communications by way of a flag setting in that request. The responder in turn transmits a response (Dynamic Service Addition Response, or DSA-RSP) to the initiator, indicating whether the responder can comply with the request, and possibly including proposed changes to the data rate requirements and other parameters as may be necessitated or desired by that station. The initiator then issues an acknowledgement (Dynamic Service Addition Acknowledgement, or DSA-ACK) to the responder, accepting the service flow as modified by the responder, or denying the modification and thereby aborting the service flow. If the acknowledgement accepts the service flow, as in the situation shown in FIG. 1*a*, traffic can then flow between the mobile station and base station, in the direction indicated in the original request (download or upload), or bidirectionally if the request so indicated.

However, under conventional 802.16 communications, an ambiguity can arise if a valid acknowledgement (DSA-ACK) sent by the initiator is not received by the responder. This situation is illustrated in FIG. 1*b*. Under the standard, if the responder does not receive the acknowledgement within a certain time-out period, it will retransmit the response (DSA-RSP) and again wait for the acknowledgement. If the error condition persists (either because the initiator does not receive the response message, or if the acknowledgement by the initiator is not received by the responder), the responder will continue issuing the response (DSA-RSP "retry" as shown in FIG. 1*b*) for a specified number of times, following which the responder will assume that the service flow is not established. Under the 802.16 standard, however, if the initiator is receiving each of these response messages as valid, and is issuing the acknowledgement in return, after its transmission of the last acknowledgement (DSA-ACK), it will assume that the responder has validly received this acknowledgement, and that the service flow is established. If the initiator of the service flow is the intended receiver of the payload, this situation is not particularly detrimental, because the unaware transmitting responder will not begin transmission of the payload traffic without receiving a valid acknowledgement from the initiator. Eventually, in this situation, the initiator may delete the service flow after elapse of a timeout period during which it receives no payload traffic. But in the unfortunate event that the initiator is also the intended transmitter of payload under the service flow, as in the example of FIG. 1b, this transmitting initiator station will transmit payload traffic unconditionally, following its issuance of the acknowledgement. This initiator will have resources assigned to transmit payload data, and will transmit that payload data, but the receiver will be ignoring or not receiving the transmission. This condition uselessly consumes resources of the transmitter station, and if the transmitter is a mobile station, will likely be uselessly consuming battery power.

By way of further background, under the IEEE 802.16 standard, a message requesting deletion of a service flow (Dynamic Service Deletion Request, DSD-REQ), may be transmitted by either the base station or the mobile station, in response to which the particular service flow is terminated, following a response from the other station (Dynamic Service Deletion Response, DSD-RSP).

BRIEF SUMMARY OF THE INVENTION

It is therefore an object of this invention to provide a wireless network device and method that ensures that an attempted service flow does not enter an ambiguous state.

It is a further object of this invention to provide such a device and method that minimizes wasteful use of transmission resources in such a wireless network.

It is a further object of this invention to provide such a device and method that operates in existing wireless networks, and in cooperation with existing base and subscriber stations in such networks.

It is a further object of this invention to provide such a device and method that is fully compatible with the IEEE 802.16 standard and specification.

Other objects and advantages of this invention will be apparent to those of ordinary skill in the art having reference to the following specification together with its drawings.

The present invention may be implemented into a wireless network device or system, at either a base station or subscriber station, in the operating software or circuitry of the device or system operating as a responder station in establishing a service flow by way of a three-way handshake protocol. The three-way handshake protocol operates, when successful, by an initiator station issuing a service flow request message, followed by a responder station issuing a service flow response message, which in turn is followed by the initiator issuing an acknowledgement message of the service flow response. After the responder station determines the absence of a valid acknowledgement message in response to one or more instances of its issued response message, the responder device transmits a service flow delete request message to the initiator. This request ensures that the initiator does not uselessly transmit payload traffic, or await payload traffic that will never be transmitted.

DETAILED DESCRIPTION OF THE INVENTION

This invention will be described in connection with its preferred embodiment, namely as implemented into a base station or subscriber station in a "WiMAX" wireless broadband network, operating under the IEEE 802.16 standard, as it is contemplated that this invention is especially beneficial when realized in such an environment. However, it is also contemplated that this invention may provide similar important benefits in other types of networks, particularly those in which a three-way handshake is used to establish connections for data. Accordingly, it is to be understood that the following description is provided by way of example only, and is not intended to limit the true scope of this invention as claimed.

Figure 2:
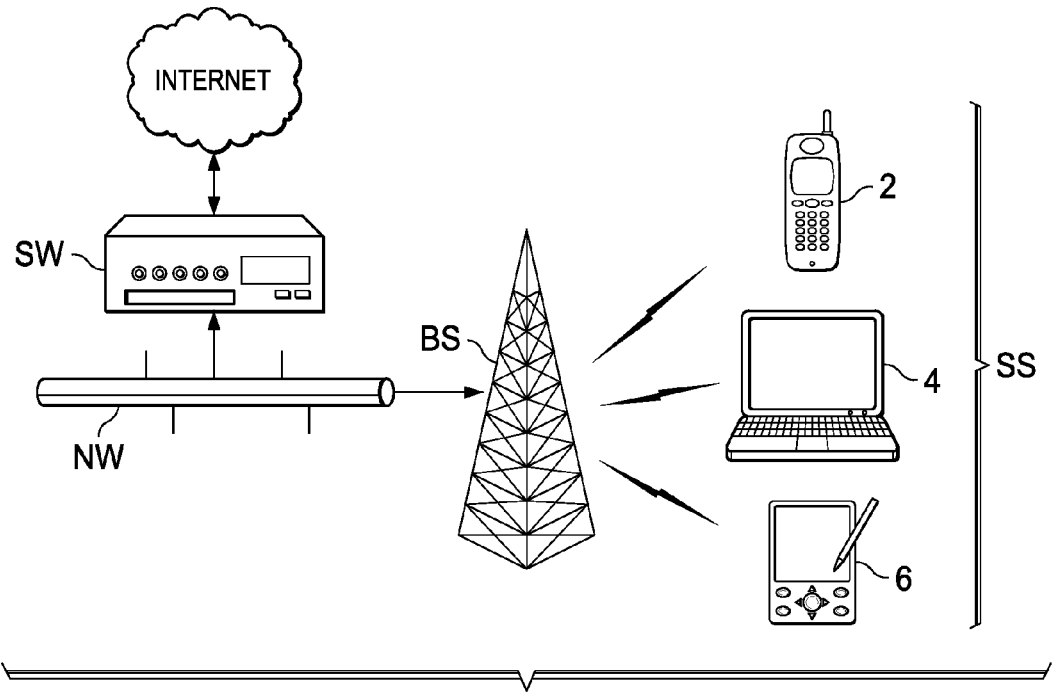
FIG. 2 is an electrical diagram, in block form, of a wireless broadband metro area network into which the preferred embodiment of the invention is implemented, by way of example.

FIG. 2 illustrates a wireless metro area network (MAN) into which the preferred embodiment of the invention is implemented. In the network of FIG. 2, base station BS corresponds to infrastructure at a fixed location, including an antenna and communication circuitry, by way of which communications between base station BS and various mobile stations or subscriber stations SS in the vicinity of base station BS are carried out. It is contemplated, in the MAN context as illustrated in FIG. 2, that wireless communications between base station BS and subscriber stations SS can be carried over distances ranging up to several miles. The particular performance and distance over which such communications can be carried out will vary, of course, with atmospheric conditions and with the nature of various attenuators (e.g., buildings, mountains) in the vicinity of base station BS.

As noted above and as evident form FIG. 2, base station BS includes an antenna tower or other antenna structure suitable for supporting communications over its coverage area. Base station BS also includes circuitry (not shown) and other support equipment suitable for communicating over backbone network NW into a wide area network (WAN) context. The example of FIG. 2 illustrates switch equipment SW as residing on backbone network NW, through which base station BS is able to communicate to and from the Internet and with various other devices and network elements coupled to the Internet, via Internet Protocol (IP) communications and the like.

In this example of FIG. 2, it is contemplated that many types of subscriber stations SS may communicate over the wireless MAN supported by base station BS. Smartphone 2 is one example of subscriber station SS, and in this example includes not only cellular telephone connectivity, but also circuitry for connecting to the wireless MAN supported by base station BS; in this manner, smartphone 2 can operate using such communications services as Internet web browsing, the sending and receipt of email messages, and other services such as Voice over Internet Protocol (VoIP) telephony. It is contemplated that smartphone 2 is thus capable of both cellular and wireless broadband communications, and supporting services such as those contemplated according to so-called "3G" or "LTE" (Long Term Evolution) wireless services. Another type of subscriber station SS that may communicate in the network of FIG. 2 is illustrated by laptop computer 4, by way of a WiMAX or wireless broadband network adapter; laptop computer 4 of course includes the circuitry, display, and software capability for carrying out services such as Internet web browsing, email communications, and VoIP telephony and the like. Similarly, personal digital assistant (PDA) 6 in FIG. 2 represents handheld wireless broadband capable devices, including not only PDAs but also palmtop or tablet computers, and the like, such devices also supporting the services contemplated in connection with wireless broadband connectivity.

Figure 3:
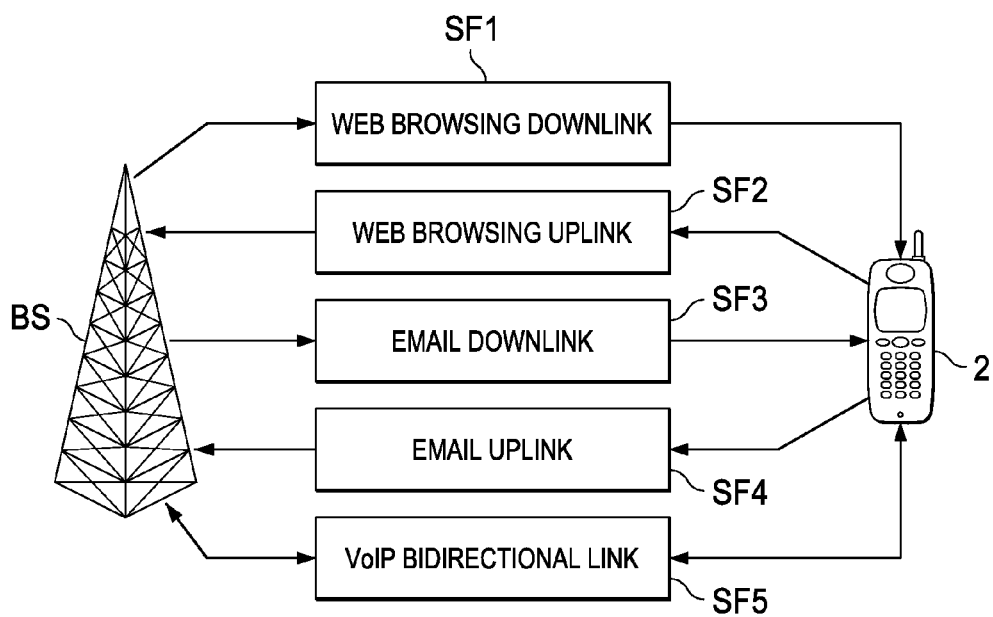
FIG. 3 is a data flow diagram illustrating multiple service flows that can be supported by an example of a base station and subscriber station SS in the network of FIG. 2, according to the preferred embodiment of the invention.

FIG. 3 illustrates an example of wireless broadband services being carried out between smartphone 2 and base station BS, in the network of FIG. 2. As known in the art, especially in connection with communications under *IEEE Standard for Local and metropolitan area networks, Part 16: Air Interface for Fixed Broadband Wireless Access Systems* (IEEE Standard 802.16-2004, and all subsequent revisions), data traffic between base station BS and subscriber station SS, such as smartphone 2 as shown in FIG. 3, is communicated over a "service flow" that has been set up and negotiated between the two stations. It is contemplated that multiple service flows may be simultaneously established and operating between base station BS and a single subscriber station SS such as smartphone 2, as suggested by FIG. 3.

In the example of FIG. 3, one service flow SF1 corresponds to a "downlink" from base station BS to smartphone 2, over which base station BS unidirectionally transmits payload data from web pages, Internet-initiated downloads, and the like to smartphone 2; a separate service flow SF2 is also established, over which web browsing commands, inputs, and uploads are transmitted by smartphone 2 to base station BS, and of course via base station BS to the Internet as supported by the wide area network with which base station BS communicates. Similarly, email communications are carried out by smartphone 2 via two unidirectional service flows SF3 (downlink) and SF4 (uplink). Typically, many service flows in wireless broadband MAN communications are established as unidirectional service flows. However, as known in the art, certain services involve bidirectional service flows, as illustrated in FIG. 3 by way of service flow SF5, which supports VoIP telephony.

Each of the service flows SF1 through SF5 can establish its own communications parameters, based on the requirements and demands agreed upon by base station BS and smartphone 2. For example, the Quality of Service parameters for VoIP telephony over service flow SF5 may permit a higher bit error rate than data transmissions over web browsing and email service flows SF1 through SF4, but may have more stringent timing requirements so that intelligible voice conversations may be carried out. Conversely, the tolerable bit error rate for data transmissions may be much more stringent for the data communications of service flows SF1 through SF4; in addition, the minimum data rates of these service flows may also be much higher than that of VoIP telephony, because of the nature of the communications and the size of the data files being transmitted and received.

Figure 4:
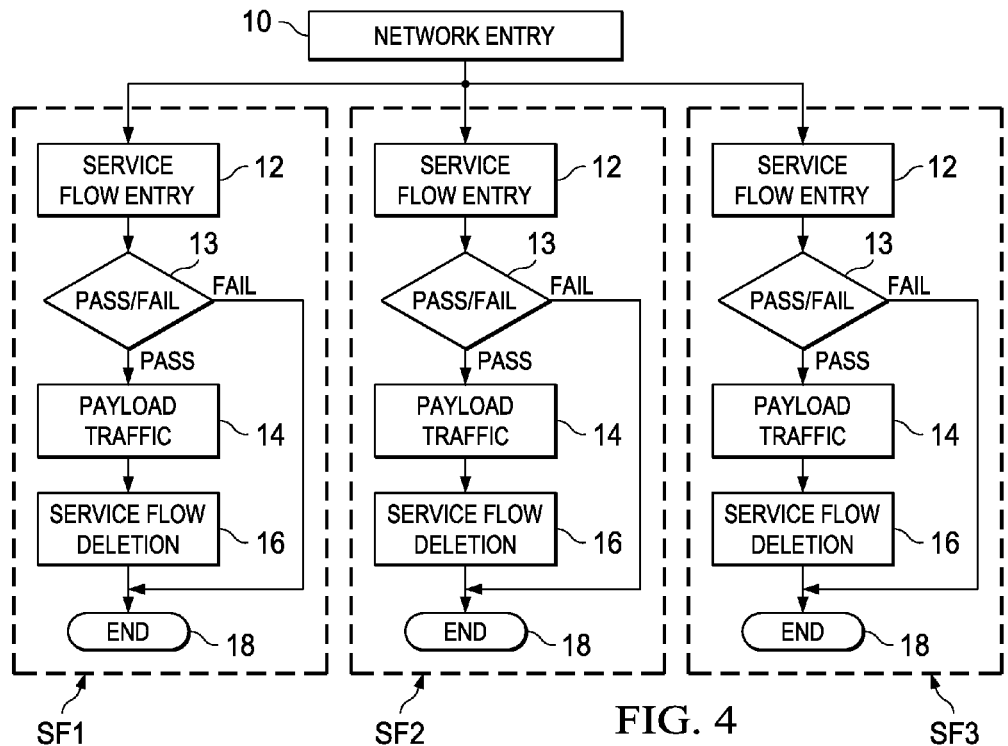
FIG. 4 is a flow diagram illustrating the operation of a base station and subscriber station SS in establishing and operating multiple service flows, such as shown in the data flow diagram of FIG. 3, according to the preferred embodiment of the invention.

FIG. 4 illustrates the operation of base station BS and subscriber station SS in carrying out communications, for example under the IEEE 802.16 standard. Upon subscriber station SS entering a physical area served by a given base station BS, and becoming enabled for wireless broadband communications, network entry process 10 is carried out at both base station BS and that subscriber station SS. According to the IEEE 802.16 standard, incorporated herein by this reference, and specifically as described in §6.3.9 of that standard, network entry process 10 involves the known operations of subscriber station SS scanning for a downlink channel from the nearby base station BS, upon which subscriber station SS and base station BS establish synchronization and comprehend transmission parameters for downlinks. Once communications are synchronized, base station BS and subscriber station SS communicate uplink transmit parameters for communications from subscriber station SS to base station BS. "Ranging" adjustments are then carried out by subscriber station SS, to align timing offset and power adjustments with base station BS, following which subscriber station SS informs base station BS of the basic capabilities of subscriber station SS, in response to which base station BS indicates whether and the extent to which it can comply with those capabilities. Subscriber station SS and base station BS then effect registration, which allows entry of subscriber station SS into the network and which assigns a network identifier to subscriber station SS. Other parameters such as the IP version to be used in communications between the stations, time of day, and other operational parameters are then communicated between base station BS and the now-registered subscriber station.

Following network entry process 10, subscriber station SS is now registered in the network and is authorized to transmit and receive communications by way of one or more service flows. As known in the art for IEEE 802.16 communications, either base station BS or subscriber station SS can initiate a service flow, regardless of the direction of the payload transmission. In other words, subscriber station SS such as smartphone 2, laptop computer 4, PDA 6, or the like can initiate a service flow to receive data communications from base station BS (i.e., a "downlink"), and can initiate a service flow to transmit data to base station BS (i.e., an "uplink"). Similarly, base station BS can also initiate a service flow of either an uplink or downlink type with subscriber station SS. In this description, the term "downlink" refers to a service flow in which the payload traffic is being transmitted from base station BS to subscriber station SS, and the term "uplink" refers to a service flow in which the payload traffic is transmitted from subscriber station SS to base station BS, regardless of which station initiated the service flow. As indicated above, "bidirectional" service flows may also be established, for example to carry out communications in a time-multiplexed or duplexed manner.

In the example of FIG. 4, three service flows SF1 through SF3 are illustrated. As evident from FIG. 4, these service flows SF1 through SF3 may be initiated and operate in parallel with one another, in the sense that, for example, service flows SF1 and SF2 may already be operating during such time as service flow SF3 is being established. The extent to which the various service flows SF1 through SF3 are "simultaneously" established depends, in large part, on the capability of subscriber station SS to multi-task its communications functions. Typically, packet-based communications permit multiple "channels" of communications to be carried out at a given time, with the channels referring to the assignment of data blocks or packets to a particular application executed at subscriber station SS. As such, to the user, subscriber station SS appears to be performing multiple communications and other tasks simultaneously, for example in different "windows" as viewable on laptop computer 4 serving as subscriber station SS.

In any case, the establishment and operation of a given service flow SF1 through SF3 in the example of FIG. 4 is carried out in substantially the same manner regardless of the particular type of communications or service type that is being established. As such, the process flow of service flow SF1 will be considered as representative of itself and the other service flows, and will be described here by way of example.

Service flow entry process 12 initiates a service flow, at the request of either base station BS or subscriber station SS, as discussed above, and regardless of the direction of the eventual traffic (i.e., regardless of whether the service flow is an "uplink", or a "downlink", or a bidirectional link). A detailed description of service flow entry process 12 according to the preferred embodiment of the invention will be provided below. In a general sense, however, service flow entry 12 according to this embodiment of the invention operates according to a "three-way handshake" arrangement, in which the station initiating service flow SF1 transmits both a request message, and an acknowledgement message following a response message transmitted by the responding station in response to the request message. The "three-way" descriptor of this handshake protocol refers to the three messages that are communicated in successfully setting up service flow SF1. The benefit of the third message in the three-way handshake is important in those protocols in which the response to the service flow request can include a proposed modification to the communications parameters; the third, acknowledgement, message permits the initiator station to affirmatively accept the modified communications parameters proposed by the responder station, and thus enables flexibility in the communications parameters by permitting equipment of a wide range of capabilities to use the network. In addition to service flow establishment under the IEEE 802.16 standard, other communications protocols also utilize a "three-way handshake"; examples of such other communications protocols include, for example, the Data Link Control (DLC) layer of the High Performance Radio Metropolitan Area Network (HIPERMAN) standard, promulgated by the European Telecommunications Standards Institute (ETSI).

Following service flow entry process 12, decision 13 is executed to determine whether service flow SF1 was successfully established. If not (decision 13 returns a "fail" result), the service flow SF1 is not established (end state 18). If service flow SF1 was successfully established (decision 13 returns a "pass" result), payload traffic is transmitted or received (depending on the viewpoint of the station, and the direction of the link established in connection with service flow SF1). Payload traffic communications continues until either subscriber station SS or base station BS requests termination of service flow SF1, which is carried out by service flow deletion process 16, resulting in end state 18.

Figure 1A:
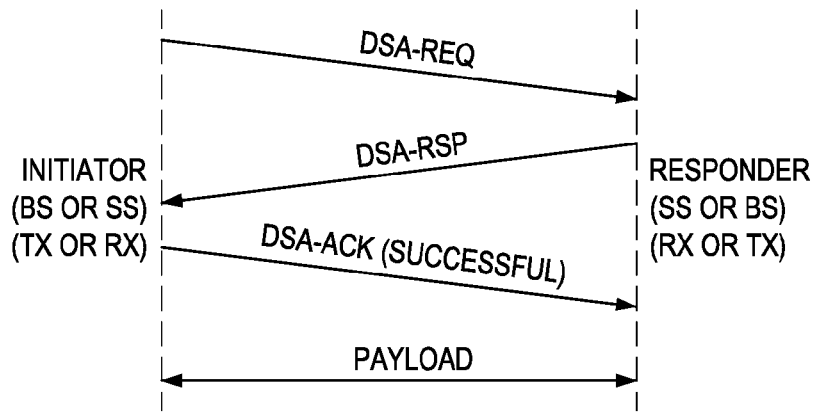
FIGS. 1a and 1b are timing diagrams illustrating the exchange of service flow establishment messages in a conventional wireless broadband network, with FIG. 1b illustrating an undesirable ambiguous state into which the network can be placed.
Figure 1B:
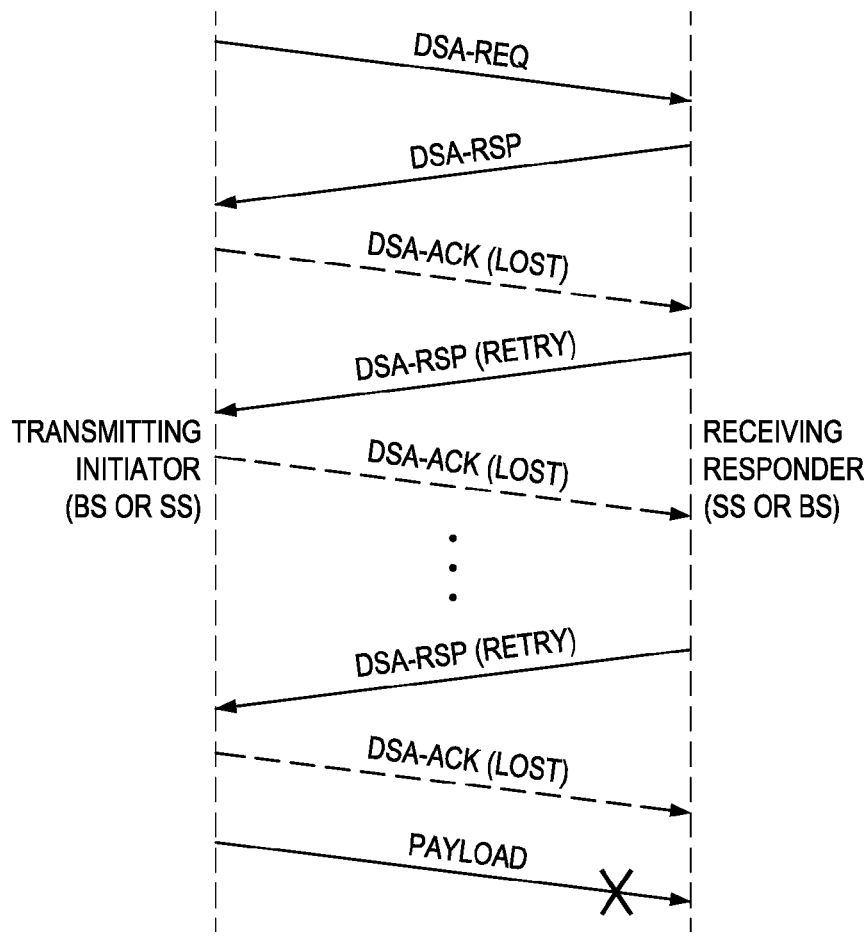

As discussed above in connection with FIG. 1, conventional three-way handshake service flow establishment presented the possibility of placing the stations in an ambiguous state, specifically a state in which the initiating station believes the service flow to have been successfully established but in which the responding station believes the service flow to have not been successfully established. This condition is especially detrimental if the transmitting station is also the initiator of the service flow, and if the transmitting station receives a valid response to the service flow request, but the receiving station fails to receive a valid acknowledgement back from the transmitting station. In this ambiguous state, the transmitting initiator station issues the acknowledgement message (DSA-ACK, for 802.16) in response to the last response message (DSP-RSP) that it received from the receiving responder station. Because no acknowledgement or other response is expected by the transmitting initiator station to its acknowledgement message, the transmitting initiator considers the service flow to have been successfully established, and thus transmits payload traffic. Unfortunately, the receiving responder does not consider the service flow to have been established, and ignores the transmissions from the transmitting station in connection with this service flow. This ambiguous state can also exist if the initiator is the receiver of the intended communications, in which case the receiver will await payload traffic that is never transmitted by the responder.

According to the preferred embodiment of the invention, the responder station is provided with the capability of expressly terminating or deleting the service flow if it does not receive a valid acknowledgement message from the initiator in response to the most recent response message that it sends. Because of this capability, should the initiator station actually be in this ambiguous state, for example in which it is transmitting payload traffic that is being ignored or awaiting the receipt of payload traffic that is never transmitted, the initiator station will delete that service flow in response to the explicit service flow delete message that it receives from the responding station. The corresponding resources at the initiator station are thus freed for use in connection with other service flows, or are simply idled so as to save power.

Figure 5:
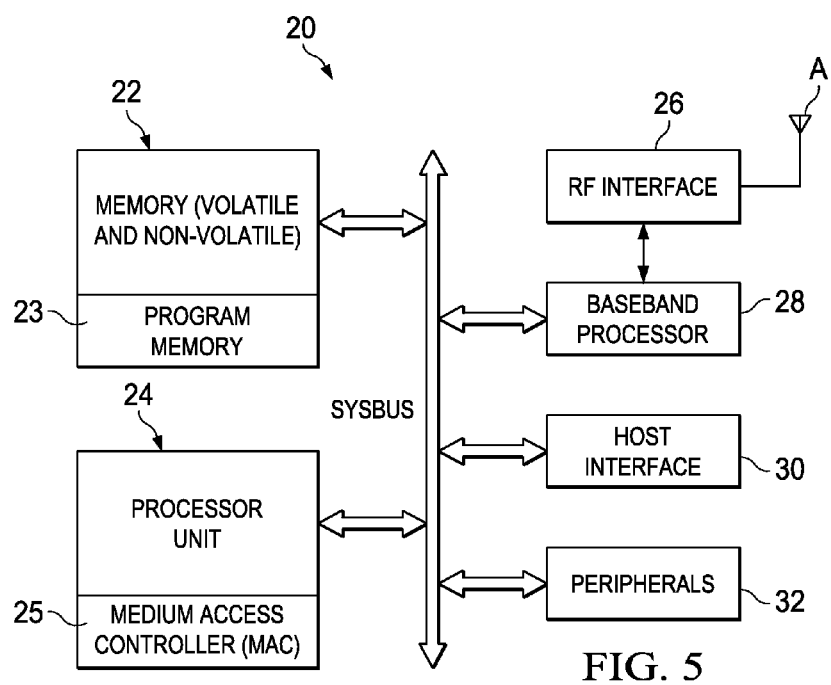
FIG. 5 is an electrical diagram, in block form, of a base station or subscriber station in the network of FIG. 2, constructed according to the preferred embodiment of the invention.

FIG. 5 illustrates the construction of network station 20 including this capability, according to a preferred embodiment of the invention. This generalized construction of network station 20 as shown in FIG. 5 is contemplated to be applicable to either base station BS or to subscriber station SS, such as smartphone 2, laptop computer 4, PDA 6, or a wireless broadband adapter or function within such subscriber station devices. In this context, therefore, network station 20 may be representative of the entire device or system, or instead of only an adapter, card, or particular built-in or added function in base station BS or such subscriber station SS. Furthermore, it will be understood by those skilled in the art having reference to this specification that the architecture illustrated in FIG. 5 is presented by way of example only, and that many variations to this architecture may alternatively be used to realize network station 20.

Network station 20 is contemplated to be implemented by way of a programmable digital computing system. As such, network station 20 includes processor unit 24, which may be implemented as a general purpose or application-specific processor, as determined by the system designer, capable of executing instructions in computer programs to carry out the overall processing and functionality of network station 20. In this arrangement of FIG. 5, network station 20 also includes memory 22, preferably including both volatile random access memory (RAM) and also non-volatile memory, for example read-only memory (ROM), flash memory, or some other type of programmable non-volatile memory. It is contemplated that at least a portion of memory 22 constitutes program memory 23, for storing instruction sequences or software routines that are executable by processor unit 24 in its operation. Typically, program memory 23 will be realized by non-volatile memory within memory 22 in one way or another, in which case the program instructions may be fetched from such non-volatile memory within memory 22 serving as program memory. Alternatively, some sort of boot-loading or other software management function may be executed on startup of network station 20, so that the program instructions (and thus program memory 23) are deployed at least in part into volatile memory within memory 22. Of course, the various portions of memory 22 (data memory and program memory; volatile and non-volatile memory; etc.) may be realized in the same memory address space or in different memory address spaces, according to the particular architecture. Memory 22 also preferably stores user-definable settings, such as time-out periods, specified numbers of retries of various control messages, and the like, in certain of its locations; alternatively, a user-writable register file may be provided as part of or accessible to processor unit 24. In the example of FIG. 5, processor unit 24 accesses memory 22 via system bus SYSBUS.

It is contemplated that the program instructions according to which MAC controller 25 or such other processing circuitry in network station 20, by execution of those instructions, carries out the operations of the preferred embodiment of this invention described herein, may be realized as a computer program, or a part of a computer program. In this regard, it is contemplated that such a computer program or portion thereof may be provided to network station 20 by way of computer-readable media, or otherwise stored in program memory 23 such as by way programming program memory 23 during or after manufacture, or provided by way of other conventional optical, magnetic, or other storage resources at those computer resources, or communicated to network station 20 by way of an electromagnetic carrier signal upon which functional descriptive material corresponding to that computer program or portion thereof is encoded.

A portion of processor unit 24 in network station 20 according to this embodiment of the invention is shown in FIG. 5 as corresponding to medium access controller (MAC) 25. MAC controller 25 may be a separate integrated circuit, or separate processor core, within processor unit 24, or alternatively may be realized by the same processor core of processor unit 24 used to perform other data processing functions within network station 20, again as may be decided by the system designer. As will be described in further detail below, in the example of network station 20 of FIG. 5, MAC controller 25 in processor unit 24 will carry out the operations involved in establishing and terminating a service flow, according to the preferred embodiment of the invention, by executing program instructions for those operations as stored in program memory 23.

Other system functions in network station include peripherals 32, shown in FIG. 5 as coupled to system bus SYSBUS, for example including input/output functions such as one or more serial ports, timer circuitry, and the like, as suitable for the particular function of network station 20. Host interface 30 is also shown in FIG. 5 is coupled to system bus SYSBUS, and serves as an interface to a host computer or other system. Host interface 30 is particularly useful if network station 20 is implemented as an adapter to a larger system, such as in the case of base station BS or laptop computer 4. In that case, the adapter of network station 20 would communicate with the host system by way of this host interface 30.

Network station 20 shown in FIG. 5 includes the appropriate circuitry for communicating in a wireless broadband network such as that shown in FIG. 2. In this arrangement, baseband processor 28, coupled to system bus SYSBUS, may be realized by a digital signal processor or other programmable logic, and performs the appropriate encoding and decoding operations, digital filtering, modulation and demodulation, as useful and appropriate for the physical layer requirements of the wireless communications protocol supported by network station 20. RF interface 26 in network station 20 is preferably realized by the appropriate digital and analog circuitry for driving radio frequency (RF) signals being transmitted, and for receiving RF signals, via antenna A. RF interface 26 communicates with baseband processor 28.

According to the preferred embodiment of the invention, network station 20 is programmed, for example by way of instructions stored in program memory 23 and executable by MAC controller 25, to expressly terminate a service flow in certain events, as will now be described in detail in connection with FIG. 6. In this regard, network station 20 operating according to the preferred embodiment of the invention is a responder station, in that another network station (whether base station BS or subscriber station SS) is initiating a service flow for communication between it and network station 20. This particular arrangement is suitable for use of the preferred embodiment of the invention, because of the ambiguous state that can be entered if the acknowledgement from the initiator (i.e., the third message in the three-way handshake) is not validly received at the responder of network station 20. It is contemplated that the operations performed by MAC controller 25 according to this preferred embodiment of the invention will be carried out by way of baseband processor 28 and RF interface 26, in combination with other functions of network station 20 as appropriate. More specifically, it is contemplated that MAC controller 25 will be programmed to process messages received from the network via antenna A and RF interface 26, as demodulated into the baseband and decoded by baseband processor 28, and communicated to MAC controller 25 over system bus SYSBUS, either via processor unit 24 or directly. Similarly, it is also contemplated that MAC controller 25 will be programmed to generate messages that it forwards to baseband processor 28, for encoding and modulation by baseband processor 28 and applied to RF interface circuitry 26 for transmission over the network via antenna A. Accordingly, it is contemplated that the instructions and operations executed by MAC controller 25 in this example of the architecture of network station 20, as shown in FIG. 5, will be carried out by MAC controller 25 itself, and by MAC controller 25 causing other functions such as baseband processor 28 and RF interface circuitry 26 to transmit messages, and by MAC controller 25 responding to messages received from the network and processed by RF interface circuitry 26 and baseband processor 28. It is also contemplated that those skilled in the art having reference to this specification will be readily able to implement the functions involved in the operation of network station 20 according to the preferred embodiment of the invention, and described herein, in a manner suitable for each particular application with which they are concerned, and without undue experimentation.

Figure 6:
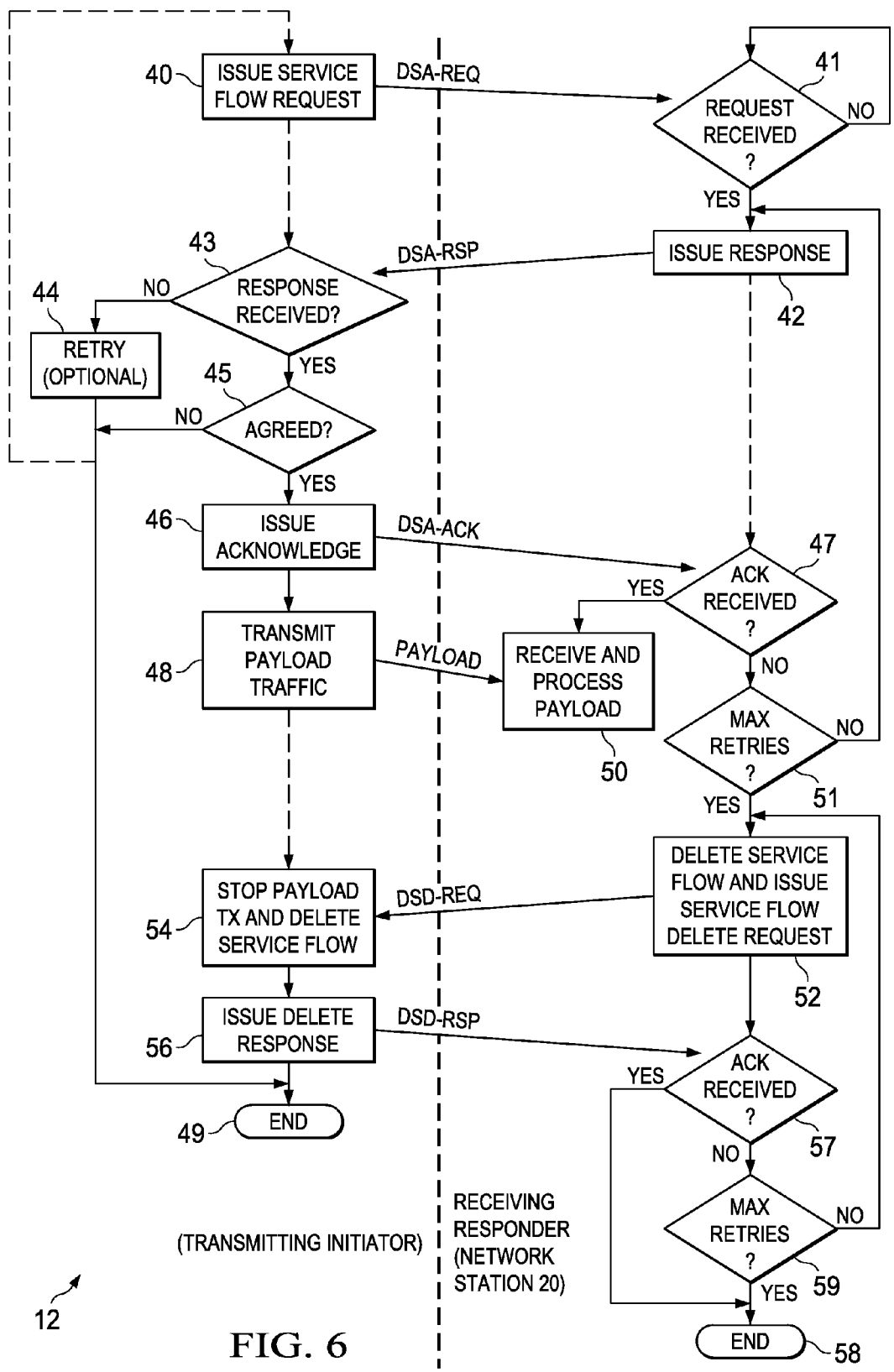
FIG. 6 is a flow diagram illustrating the operation of an initiator station and subscriber station SS in establishing a service flow, according to the preferred embodiment of the invention.

Referring now to FIG. 6, the operation of the preferred embodiment of the invention will now be described by way of an example in which the initiator of a service flow is also the intended transmitter of the payload traffic, because it is contemplated that this invention is particularly beneficial in that situation. However, it is also contemplated that this operation will also be applicable, and beneficial, for terminating an ambiguous service flow state if the initiator of the service flow is also the intended receiver of the payload traffic, and thus it is contemplated that the skilled artisan having reference to this specification will comprehend such operation from the example of FIG. 6. FIG. 6 illustrates the operation of both the initiator and also the responder of network station 20, in this example, so that the operation of the preferred embodiment of the invention can be fully explained. However, it will be apparent to those skilled in the art that only network station 20, as the responder of the attempted service flow in this situation, need be programmed according to this preferred embodiment of the invention. In other words, this invention can be realized with benefit even if only one of the communicating network stations is programmed in this manner. Of course, if the network station operating as an initiator is also programmed according to the preferred embodiment of the invention, then ambiguities in the failed establishment of a service flow can also be avoided in the event that network station is a responder that does not receive a valid acknowledgement message in the establishment of a different service flow from that shown in FIG. 6.

The following description of the operation of the preferred embodiment of the invention will refer to various messages under the IEEE 802.16 WiMAX wireless broadband standard. It is to be understood that those specific messages, and that specific standard, are used in this description by way of example only, and that any such reference to that standard and those particular messages is not intended to limit the scope of the invention as claimed. However, it is contemplated that this invention is especially beneficial when applied to network stations operating under the IEEE 802.16 communications standard, and as such it is contemplated that the use of the IEEE 802.16 standard by way of example will be especially illustrative.

Prior to the operations illustrated in FIG. 6, network entry process 10 (FIG. 4) has already been successfully performed, such that the initiator and responder are aware of each other in the network, and whichever of these network stations is the mobile or subscriber station is registered in the network. One or more service flows may already be established and operating at this time, or alternatively the process of FIG. 6 may be performed in establishing the first service flow. According to this embodiment of the invention, process 40 initiates the establishment of a service flow, by way of the initiator issuing a service flow request to the responder. According to the example of IEEE 802.16 communications, this service flow request corresponds to the DSA-REQ message, in which the initiator transmits identifying information about itself and this service flow establishment transaction, along with service flow parameters, such as quality of service (QoS) parameters, and desired encodings for the potential service flow. At this time, network station 20, as the responder, is executing decision 41, by way of which it awaits the receipt of a service flow request from the network station with which it is in communication. Upon receipt of the service flow request message DSA-REQ (decision 41 returns a "yes"), network station 20 (i.e., MAC controller 25 in network station 20) executes process 42 to issue a response message to the initiator of the service flow. In this example, in which communications are carried out under the IEEE 802.16 standard, the response message corresponds to the DSA-RSP message, and includes identifying information regarding network station 20 and the current transaction, as well as a confirmation code indicating confirmation of the DSA-REQ message. In addition, assuming that the transaction is successful to this point, the response message DSA-RSP may also contain service flow parameters and encodings proposed by network station 20 for the proposed service flow; these proposed parameters and encodings may be modifications to the parameters and encodings proposed by the initiator in the DSA-REQ message. If, for some reason, the transaction is not successful at this point, network station 20 may issue a service flow error indicator in the response message DSA-RSP; for purposes of this description, however, it is assumed that the transaction is successful, and that the response message DSA-RSP indicates a successful state.

Meanwhile, the initiator executes decision 43 to determine whether the appropriate response (DSA-RSP) is received from network station 20 as the responder to its service flow request. If not (decision 43 is "no"), the initiator can retry the request if desired (process 44), or simply end the attempt to establish the service flow (end state 49). On the other hand, if the initiator receives a valid response message DSA-RSP (decision 43 is "yes"), it next executes decision 45 to determine whether it accepts modifications to the transmission parameters, if any, that are proposed by network station 20 in the response message DSA-RSP. If not (decision 45 is "no"), the service flow is aborted (end state 49). If no modifications were proposed by network station 20, or if all such modifications proposed by network station 20 are accepted by the transmitting initiator (decision 45 is "yes"), the initiator then issues the acknowledgement message (DSA-ACK) to network station 20, in its role as responder, in process 46. The acknowledgement message DSA-ACK, under the example of the IEEE 802.16 standard, includes identification of the transaction and a confirmation code indicating acceptance of the modified parameters, and thus acceptance of the service flow as currently constituted. In this example as shown in FIG. 6, the initiator of the service flow serves as the transmitter of the payload traffic, while network station 20 is the intended receiver of the payload traffic over this service flow. As such, following the issuance of this acknowledgement message DSA-ACK, under this three-way handshake protocol, the transmitting initiator begins transmitting live payload traffic for the service flow, in process 48, according to the agreed-upon and accepted parameters between the two network stations. Meanwhile, network station 20, as the receiving responder for the proposed service flow, has been awaiting the acknowledgement message DSA-ACK from the transmitting initiator, after its issuance of the response message DSA-RSP in process 42, in decision 47. Upon receipt of a valid acknowledgement message (DSA-ACK) by network station 20 as the receiving responder (decision 47 is "yes"), network station 20 receives and processes the payload traffic then transmitted by the transmitting initiator network station, in process 50, according to the function of the service flow and of network station 20 and any host computer system with which it is associated.

However, in the event that network station 20 does not receive the acknowledgement message within a specified time (typically a user-defined time-out period stored in a register or location of memory 22 in network station 20), decision 47 returns a "no" result. If the failure detected by decision 47 is after the first attempt of response message DSA-RSP, or after fewer than a maximum number of retries (i.e., decision 51 executed by network station 20 returns a "no" result), network station 20 repeats process 42 to again issue the response message DSA-RSP, following which decision 47 is again executed to determine whether a valid acknowledge message DSA-ACK is received. Upon successive failed attempts to receive a valid acknowledge message DSA-ACK in response to the response message DSA-RSP reaching a user-defined maximum number of retries (decision 51 returns a "yes"), network station 20 as the responder executes process 52, according to this embodiment of the invention.

As discussed above, the IEEE 802.16 standard includes a service flow delete request message DSD-REQ and protocol, in its set of available control messages. This service flow delete request message DSD-REQ is a control message that may be transmitted by either network station within an existing and operating service flow, to request that the service flow be terminated and deleted. This service flow delete request message DSD-REQ may be sent either by the initiator of the service flow or the responder, and may be sent by either the transmitter or the receiver of the payload data (and, accordingly, may be sent by either of base station BS or subscriber station SS). The network station receiving the service flow delete request message DSD-REQ confirms the deletion request by in turn issuing a service flow delete response message DSD-RSP, under the IEEE 802.16 standard. According to the preferred embodiment of this invention, however, network station 20 removes the service flow from its internal state and explicitly transmits a service flow delete request message DSD-REQ to the transmitting initiator in response to not receiving a valid acknowledge message DSA-ACK from the transmitting initiator during the setting up of a service flow, and after the maximum number of retries of the response message DSA-RSP, in process 52. This service flow delete request message DSD-REQ includes identifying information regarding the transaction and the service flow to be deleted, specifically referring to the very service flow that the transmitting initiator intended to establish with network station 20.

Upon receipt of the service flow delete request message, the initiator executes process 54 to stop the transmission of payload traffic and delete the service flow, and then also executes process 56 to transmit a confirming response message DSD-RSP to network station 20, which, upon its valid receipt of the response message DSD-RSP (decision 57 is "yes"), then terminates the service flow process at its end (end state 58). The initiator also terminates the processing of this service flow, by entering end state 49. If network conditions cause the response message DSD-RSP to not be validly received (decision 57 is "no"), network station 20 can retransmit the service flow delete message DSD-REQ up to a maximum number of retries, via operation of decision 59 and repetition of process 52 and decision 57. Even if a valid response message DSD-RSP is not correctly received at responder network station 20 within the maximum number of retries, an ambiguous state is avoided by the operation of each network station (responder and initiator) having deleted the service flow from its local state prior to transmission of the respective DSD-REQ and DSD-RSP messages.

According to the preferred embodiment of the invention, entry of the initiator of a service flow into an ambiguous state because of a failure of the third message in a three-way handshake protocol is avoided, regardless of the cause of the message failure, as will now be described. One way in which the acknowledge message DSA-ACK would not be validly received by network station 20 as the responder is if the initiator in fact transmits the acknowledge message, but that message is not validly received because of a change in the channel conditions, or movement of network station 20, or some other event or cause occurring after the successful receipt of the original request message. In this situation, the initiator continues to receive valid response messages DSA-RSP, as each is retried by network station 20, in response to each of which it issues the acknowledge message DSA-ACK that is not received by network station 20. After the last retry of the response message, and acknowledgement, the initiator reasonably assumes that the service flow has been established and would begin transmitting payload traffic if it is to serve as the transmitter for that service flow, as in the example of FIG. 6; this payload traffic would either not be validly received at network station 20, or would be ignored by network station 20 because of the absence of a valid acknowledge message. According to the preferred embodiment of this invention, however, the explicit service flow delete message DSD-REQ issued by network station 20, as the responder, causes the initiator to cease transmission of payload traffic and to thus exit the ambiguous state in which the transmitting network station is transmitting but the payload is not being received, for the example shown in FIG. 6 in which the initiating station is also the transmitter.

Another cause of the valid acknowledge message DSA-ACK not being received is because the initiator did not receive a valid response message DSA-RSP from network station 20, and thus never did issue the acknowledge message DSA-ACK. In this case, the initiator would already be assuming that the service flow failed (decision 43 is "no"). In this case, even if the initiator receives the service flow delete message DSD-REQ issued by network station 20 in process 52 (such receipt being doubtful, considering that the response message was not received), this message would effectively be redundant to the initiator because, from its viewpoint, the service flow was never established. The ambiguous state is thereby also avoided if the failure is due to this cause.

As discussed above, the example of FIG. 6 is illustrated for the case in which the initiating network station is the eventual transmitter of the payload traffic. In the case that the initiator network station is instead the intended recipient of the payload traffic, the ambiguous state would exist only at this initiator (i.e., the "receiving initiator", in this case), because the responder is the transmitter of the payload and will not transmit the payload without receiving a valid acknowledge message. According to the preferred embodiment of the invention, the transmitting responder (network station 20) will also send a service flow delete message DSD-REQ to the receiving initiator in the absence of the valid acknowledge message DSA-ACK, which will cause the receiving initiator to delete the service flow and exit its ambiguous state. While the receiving initiator may, in this case, eventually delete the service flow after the elapse of a user-defined time period during which no payload traffic is received, the explicit service flow delete message DSD-REQ sent by the transmitting responder, according to this embodiment of the invention, will enable faster synchronization of the two network stations. This faster synchronization results from the retry timeout period on the transmitting responder being much shorter than the timeout period at the receiving initiator for lack of payload traffic.

According to the preferred embodiment of the invention, therefore, waste of transmitting network station resources from being placed into the ambiguous state in which it is transmitting payload that is not being received or is being ignored by the receiving network station, is avoided. And the unnecessary reservation of resources and delays in establishing communications that would result from an receiving network station from being placed in this ambiguous state, and in which it would be awaiting payload traffic that will never be transmitted, is also avoided. Not only does this conserve computing and processing capacity at the transmitting network station but, especially if the transmitting station is a mobile battery-powered station, power is not needlessly consumed by transmitting data that no other station is listening to.

In addition, this embodiment of the invention can be readily implemented into existing wireless networks, by way of a software update to a network station in subscriber station SS or base station, as the case may be. This ease of implementation is especially available in IEEE 802.16 standard equipment, because of the availability of the explicit delete service flow request protocol, and the use of this existing message functionality by a network station constructed according to this invention, to perform this additional function during the establishment of a service flow. Processing capacity and power consumption on the part of the other network station are thus saved, even though no change to the operating software or circuitry for that other network station need be made. Of course, if all network stations include this capability, then all network stations would be spared this ambiguous operation.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A process of attempting to establish a wireless network communication connection comprising:
    A. receiving a dynamic service addition request at a wireless network device;
    B. sending a dynamic service addition response from the device in response to the receiving a dynamic service addition request;
    C. waiting for and failing to receive a dynamic service addition acknowledgement in response to the sending a dynamic service addition response;
    D. re-sending a dynamic service addition response from the device in response to the waiting for and failing to receive a dynamic service addition acknowledgement;
    E. again waiting for and failing to receive a dynamic service addition acknowledgement in response to the sending a dynamic service addition response; and
    F. sending a dynamic service deletion request from the device after repeating the re-sending and again waiting for and failing to receive a dynamic service addition acknowledgement a certain number of times.

2. The process of claim 1 including:
    A. waiting for and failing to receive a dynamic service deletion response in the device in response to the sending a dynamic service deletion request;
    B. re-sending a dynamic service deletion request from the device in response to the waiting for and failing to receive a dynamic service deletion response;
    C. again waiting for and failing to receive a dynamic service deletion response in response to the sending a dynamic service deletion request; and
    D. ending communications from the device after repeating the re-sending a dynamic service deletion request and again waiting for and failing to receive a dynamic service deletion response a certain number of times.

* * * * *